(12) United States Patent
Taguchi (10) Patent No.: US 10,020,519 B2
(45) Date of Patent: Jul. 10, 2018

(54) MOLDING METHOD FOR REMOVING SEPARATOR DISTORTION AND MOLDING DEVICE FOR REMOVING SEPARATOR DISTORTION

(71) Applicant: Nissan Motor Co., Ltd., Yokohama-shi, Kanagawa (JP)

(72) Inventor: Naoto Taguchi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 65 days.

(21) Appl. No.: 14/891,682

(22) PCT Filed: Apr. 17, 2014

(86) PCT No.: PCT/JP2014/060984
§ 371 (c)(1),
(2) Date: Nov. 17, 2015

(87) PCT Pub. No.: WO2014/196277
PCT Pub. Date: Dec. 11, 2014

(65) Prior Publication Data
US 2016/0211532 A1    Jul. 21, 2016

(30) Foreign Application Priority Data
Jun. 4, 2013 (JP) ................. 2013-118066

(51) Int. Cl.
*B21D 13/02* (2006.01)
*H01M 8/0254* (2016.01)
(Continued)

(52) U.S. Cl.
CPC .......... *H01M 8/0254* (2013.01); *B21D 1/065* (2013.01); *B21D 1/10* (2013.01); *B21D 13/02* (2013.01); *H01M 2008/1095* (2013.01)

(58) Field of Classification Search
CPC . B21D 1/06; B21D 1/10; B21D 13/00; B21D 13/02; B21D 13/10; H01M 8/0254
See application file for complete search history.

(56) References Cited

U.S. PATENT DOCUMENTS 2,079,553 A * 5/1937 Fraser ................... B21D 13/02
                                                                72/396
2,510,024 A * 5/1950 Mayer ................... B21D 13/02
                                                                72/397
(Continued)

FOREIGN PATENT DOCUMENTS

CN          1711658 A      12/2005
JP          58-20338 A  *   2/1983  ............. B21D 53/04
(Continued)

*Primary Examiner* — Edward Tolan
(74) *Attorney, Agent, or Firm* — Global IP Counselors, LLP (57) ABSTRACT

A molding method and a molding device are provided for removing distortion in a separator. In the molding method and the molding device, first and second dies which correspond to a product shape of first and second pre-molded surfaces of a separator base material. In a first molding step, the first die is pressed by applying an impact force towards the first molding surface side of the separator base material causing the separator base material to move towards the second dies. In the second molding step, the second dies are pressed towards the second molding surface side of the separator base material, and the molding part of the separator base material is sandwiched between the first die and the second dies.

15 Claims, 8 Drawing Sheets

(51) Int. Cl.
   *B21D 1/06*      (2006.01)
   *B21D 1/10*      (2006.01)
   *H01M 8/1018*    (2016.01)

(56) References Cited

U.S. PATENT DOCUMENTS

| | | | | |
|---|---|---|---|---|
| 3,340,719 | A * | 9/1967 | Kandle | B21D 13/02 72/384 |
| 3,748,880 | A * | 7/1973 | Atkins | B60R 25/06 292/150 |
| 4,635,462 | A * | 1/1987 | Bald | B21D 13/02 72/385 |
| 4,819,473 | A * | 4/1989 | Jansen | B21D 13/10 72/382 |
| 4,840,054 | A * | 6/1989 | Sjogren | B21D 53/36 72/382 |
| 7,178,374 | B2 * | 2/2007 | Enjoji | B21D 13/02 72/312 |
| 7,642,481 | B2 * | 1/2010 | Kismarton | B21D 13/02 219/121.63 |
| 8,915,113 | B2 * | 12/2014 | Matheisl | B21D 13/02 72/379.6 |
| 9,099,690 | B2 | 8/2015 | Watanabe et al. | |
| 2004/0144151 | A1 * | 7/2004 | Allen | B21D 1/00 72/295 |
| 2009/0081520 | A1 | 3/2009 | Seido et al. | |

FOREIGN PATENT DOCUMENTS

| | | |
|---|---|---|
| JP | 4-2878 B2 | 1/1992 |
| JP | 2003-249238 A | 9/2003 |
| JP | 2009-76304 A | 4/2009 |
| JP | 4529439 B2 | 6/2010 |
| JP | 2012-209265 A | 10/2012 |
| WO | 2006/135108 A1 | 12/2006 |

* cited by examiner

MOLDING METHOD FOR REMOVING SEPARATOR DISTORTION AND MOLDING DEVICE FOR REMOVING SEPARATOR DISTORTION

CROSS-REFERENCE TO RELATED APPLICATIONS

This application is a U.S. National stage application of International Application No. PCT/JP2014/060984, filed Apr. 17, 2014, which claims priority to Japanese Patent Application No. 2013-118066 filed in Japan on Jun. 4, 2013.

BACKGROUND

Field of the Invention

The present invention relates to a molding method for removing distortion in a separator, and to a molding device for removing distortion in a separator, in which the molding method is embodied.

Background Information

Prior art fuel cells are composed of multiple, alternately-stacked separators and membrane-electrode assemblies. As a fuel cell will have a higher output according to the number of stacked separators and membrane-electrode assemblies, it is preferable to increase the number of stacked layers. By bringing about sufficiently intimate adhesion of the multiple stacked separators and membrane-electrode assemblies, conduction resistance can be reduced, and the desired cell capabilities achieved.

In a separator, sections termed "active areas," through which a fuel gas (hydrogen) and an oxidant gas (air containing oxygen) are made to flow, are designed with finely irregular shapes. The degree of dimensional accuracy required in these irregularly shaped sections is high. On the other hand, such irregular shapes are difficult to mold with high accuracy, due to distortion that remains in the interior during the molding stage, and the like.

A technique for manufacturing a fuel cell by alternately stacking multiple separators and membrane-electrode assemblies has been disclosed. Also disclosed is a technique in which, in this fuel cell manufacturing method, runners at both edges in the width direction are held down by rollers, thereby correcting warpage of the belt-shaped sheet material that serves as the material for the separator, as the material is transported (e.g., see Japanese Patent No. 4,529,439). Meanwhile, a technique for forming a molded article by explosive molding has been disclosed as another mode of a molding method (e.g., see Japanese Patent No. 4-002878).

SUMMARY

However, in both the aforementioned patent documents 1 and 2, the issue of removing distortion from a base material, such as a pre-molded separator, to achieve high accuracy in final molding is not necessarily taken into consideration. Specifically, with the configurations according to the aforementioned documents, it is difficult to sufficiently remove distortion remaining in the interior of the separator during molding, and a phenomenon known as "springback" tends to occur. For this reason, there exists a need for a technique by which distortion can be removed, and the separator molded with high accuracy.

The present invention was made with a view to solving the above-mentioned problem, and has as an object to provide a molding method and a molding device by which distortion in a separator can be removed, and the separator molded with high accuracy.

The molding method for removing distortion in a separator according to the present invention to attain the aforementioned object is a method for removing distortion in a molding part of a separator base material which has been pre-molded to a shape corresponding to the product shape. In this molding method there are employed a first die which corresponds to the product shape of a first molding surface pre-molded onto a first surface of the separator base material, and second dies which are opposed to the first die and which correspond to the product shape of a second molding surface pre-molded onto the other surface opposite the first surface of the separator base material. The molding method has a first molding step and a second molding step. In the first molding step, the first die is pressed by applying an impact force towards the first molding surface side of the separator base materials, causing the separator base material to move towards the second dies. In the second molding step, which follows the first molding step, the second dies are pressed towards the second molding surface side of the separator base material, and the molding parts of the separator base material are sandwiched between the first die and the second dies.

The molding device for removing distortion in a separator according to the present invention to attain the aforementioned object is a device for removing distortion in molding parts of a separator base material, which has been pre-molded to a shape corresponding to the product shape. This molding device has a first die, second dies, and a controller. The first die corresponds to the product shape of a first molding surface pre-molded onto a first surface of a separator base material. The second dies correspond to the product shape of a second molding surface pre-molded onto the other surface opposite the first surface of the separator base material. The controller controls the operation of the first die and the second dies. The controller performs a control so as to apply an impact force to press the first die towards the first molding surface side of the separator base material, causing the separator base material to move in a direction towards the second dies. Thereafter, the controller performs a control so as to press the second dies towards second molding surface side of the separator base material, and sandwich the molding parts of the separator base material between the first die and the second dies.

BRIEF DESCRIPTION OF THE DRAWINGS

Referring now to the attached drawings which form a part of this original disclosure.

DETAILED DESCRIPTION OF THE EMBODIMENTS

An embodiment according to the present invention is described below with reference to the accompanying drawings. In the description of the drawings, identical elements are assigned identical symbols, and description is omitted where redundant. There are cases in which the sizes and ratios of the components in the drawings are exaggerated for convenience in the description and differ from the actual sizes and ratios.

A processing machine 100 provided with a molding device 1 for removing distortion in a separator 51 according to the present embodiment, and the molding device 1 for removing distortion in the separator 51, shall be described with reference to FIGS. 1-15.

Figure 1:
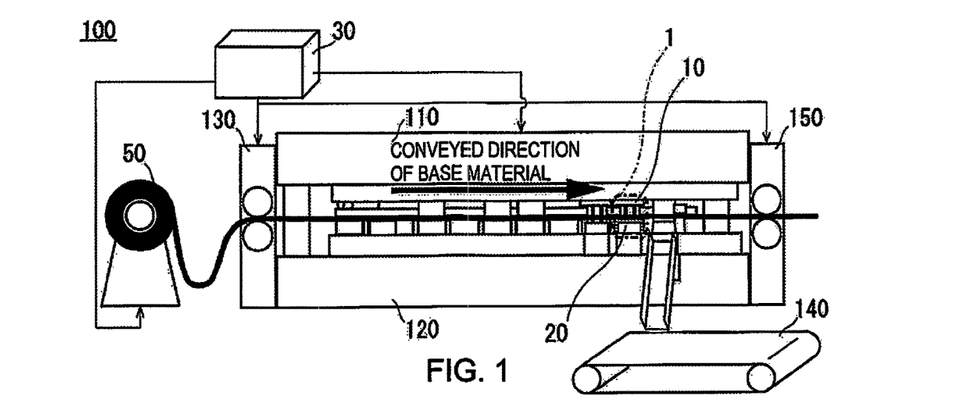
FIG. 1 is a schematic diagram showing a processing machine provided with a molding device for removing distortion in a separator according to an embodiment of the present invention.
Figure 3:
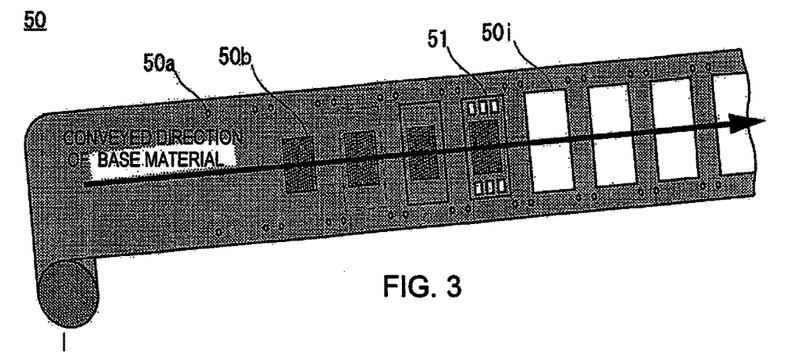
FIG. 3 is a schematic diagram showing a separator base material having undergone various molding processes using a processing machine provided with a molding device for removing distortion in a separator.
Figure 4:
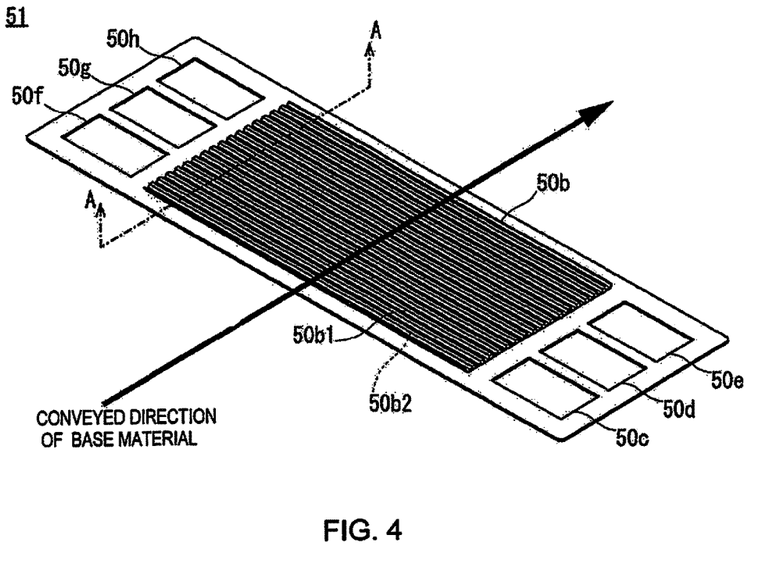
FIG. 4 is a schematic diagram showing the separator in the separator base material of FIG. 3.

Firstly, the configuration of the processing machine 100 provided with the molding device 1 for removing distortion in the separator 51 is described, while referring to FIGS. 1, 3, and 4.

FIG. 1 is a schematic diagram showing the processing machine 100 provided with the molding device 1 for removing distortion in the separator 51. FIG. 3 is a schematic diagram showing a separator base material 50 having undergone various molding processes using the processing machine 100 provided with the molding device 1 for removing distortion in the separator 51. FIG. 4 is a schematic diagram showing the separator 51 in the separator base material 50 of FIG. 3.

The processing machine 100 molds openings, irregularities, and the like into the separator base material 50, which is equivalent to an elongated member being processed. As shown in FIG. 1, the processing machine 100 includes an upper die 110, a lower die 120, an incoming feeder 130, an outgoing conveyor 140, an outgoing feeder 150, and a controller 30. The molding device 1 is provided to the processing machine 100.

The upper die 110 and the lower die 120 mold openings, irregularities, and the like into the separator base material 50. The upper die 110 is provided with a first molding part 10 of the molding device 1, described later. Likewise, the lower die 120 is provided with a second molding part 20 of the molding device 1, described later. The upper die 110 and the lower die 120 are constituted by arranging multiple types of press processing machines along the conveying direction of the separator base material 50. As shown in FIG. 3, the multiple types of press processing machines mold into the separator base material 50 locating holes 50a for positioning, irregular-shaped molding parts 50b, and manifold holes for supplying and discharging a medium, and then punch outside edge sections of the separator 51 to open up a punch hole 50i. As shown in FIG. 4, the manifold holes correspond to an anode gas supply port 50c, a cooling fluid supply port 50d, a cathode gas supply port 50e, a cathode gas discharge port 50f, a cooling fluid discharge port 50g, and an anode gas discharge port 50h. The anode gas corresponds to a fuel gas (hydrogen). The cathode gas corresponds to an oxidation gas (air containing oxygen).

The incoming feeder 130 is situated to the upstream side of the upper die 110 and the lower die 120, and conveys the yet-unprocessed separator base material 50 in between the upper die 110 and the lower die 120. The outgoing conveyor 140 conveys the separator 51 that has been punched out from the separator base material 50 that has undergone processing of openings, irregularities, and the like. The outgoing feeder 150 is provided to the downstream side of the upper die 110 and the lower die 120, and conveys the processed separator base material 50, which is to be discarded, out from between the upper die 110 and the lower die 120. The controller 30 respectively controls the speed and timing at which the separator base material 50 is conveyed in by the incoming feeder 130, as well as the speed and timing at which the separator base material 50 is conveyed out by the outgoing feeder 150. The controller 30 controls the upper die 110, which is a movable die, such that after the upper die 110 is urged towards the lower die 120, which is a stationary die, the upper die 110 is separated from the lower die 120.

Next, the configuration of the molding device 1 for removing distortion in the separator 51 is described with reference to FIGS. 1, 2, and 4.

Figure 2:
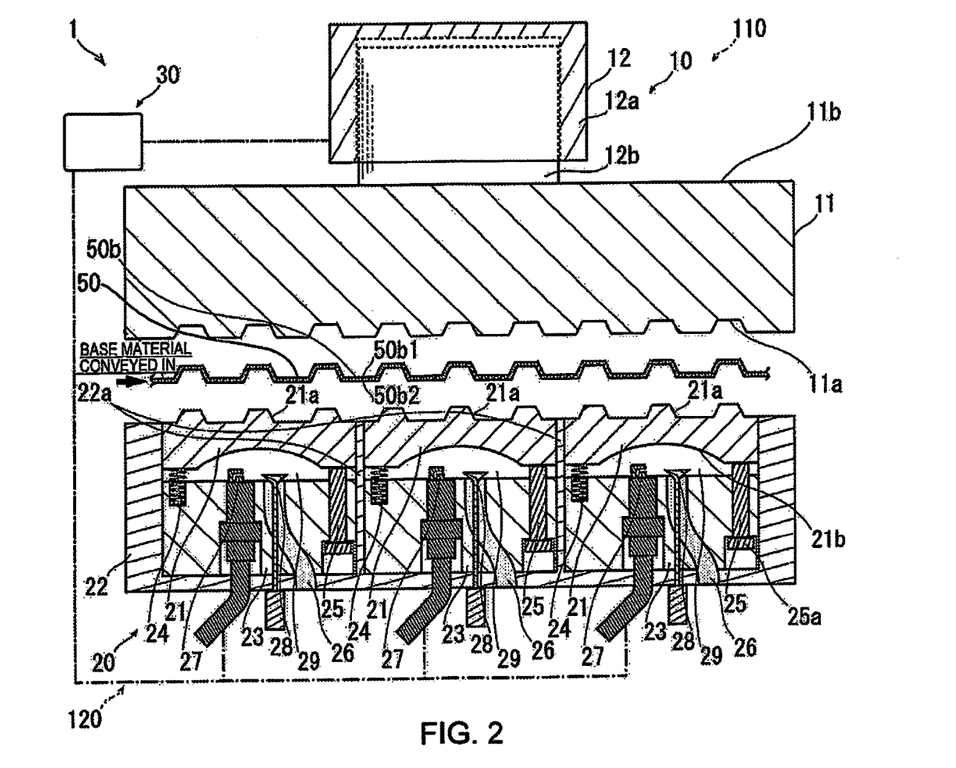
FIG. 2 is an end surface view showing a major portion of the molding device for removing distortion in a separator provided to the processing machine of FIG. 1, seen from a side surface.

FIG. 2 is an end surface view showing a major portion of the molding device 1 for removing distortion in the separator 51, provided to the processing machine 100 of FIG. 1, as seen from a side surface. FIG. 2 shows the molding device 1, from an end face in a direction lying along line A-A in FIG. 4. To facilitate understanding of the present embodiment, the number of irregular shapes of channels in the molding parts 50b of the separator base material 50 illustrated in FIG. 2 is depicted as being considerably fewer than the number of irregular shapes of the channels in the molding parts 50b of the separator base material 50 illustrated in FIG. 4.

The molding device 1 corresponds to a device embodying the molding method for removing distortion in the separator 51. This molding method for removing distortion in the separator 51 has a first molding step and second molding step. In the first molding step, a first die 11 is pressed with an impact towards a side of a first molding surface 50b1 of the separator base material 50, causing the separator base material 50 to move towards second dies 21. In the second molding step following the first molding step, the second dies 21 are pressed towards a second molding surface 50b2 side of the separator base material 50, and the molding parts 50b of the separator base material 50 is sandwiched between the first die 11 and the second dies 21.

The molding device 1 removes distortion in the molding parts 50b of the separator base material 50 pre-molded to a shape corresponding to the product shape. This molding device 1 has the first die 11, the second dies 21, and the controller 39. The first die 11 corresponds to the product shape of the first molding surface 50b1 pre-molded onto a first surface of the separator base material 50. The second dies 21 correspond to the product shape of the second molding surface 50b2 pre-molded onto the other surface opposite the first surface of the separator base material 50. The controller 30 controls the operation of the first die 11 and the second dies 21. The controller 30 controls the first die 11 so that the first die 11 is pressed by applying an impact force to the side of the first molding surface 50b1 of the separator base material 50, causing the separator base material 50 to move towards the second dies 21. Thereafter, the controller 30 performs a control so as to press the second dies 21 towards second molding surface 50b2 side of the separator base material 50, and sandwich the molding parts 50b of the separator base material 50 between the first die 11 and the second dies 21.

The molding device 1 has the first die 11, the second dies 21, and the controller 30.

The first die 11 corresponds to the product shape of the first molding surface 50b1 that is pre-molded onto a first surface of the separator base material 50. The first die 11 is included within the first molding part 10. The first molding part 10 is responsible for the first molding step. The first molding part 10 applies an impact force to press the first die 11 towards the side of the first molding surface 50b1 of the separator base material 50, causing the separator base material 50 to move towards the second dies 21.

The first molding part 10 includes a drive member 12, in addition to the first die 11. The first die 11 is composed, for example, of metal, and describes an oblong shape. The first die 11 has a first molding surface 11a which is opposed to the second dies 21, and which is formed by irregular shapes lined up at constant spacing, so as to correspond to the product shape of the first molding surface 50b1 that is pre-molded onto a first surface of the separator base material 50. This product shape is equivalent to the final shape of the first molding surface 50b1 of the separator 51. The drive member 12 moves the first die 11 closer to and away from the second dies 21. The drive member 12 is composed, for example, of a hydraulic pump, and drives a cylinder part 12b accommodated within a cylindrical tube part 12a. The cylinder part 12b is joined to a pressing surface 11b opposite from the first molding surface 11a of the first die 11.

The second dies 21 correspond to the product shape of the second molding surface 50b2 pre-molded onto the other surface opposite the first surface of the separator base material 50. The second dies 21 are included within the second molding part 20. The second molding part 20 is responsible for the second molding step. The second molding part 20 presses the second dies 21 towards the side of the second molding surface 50b2 of the separator base material 50, sandwiching the molding parts 50b of the separator base material 50 between the first die 11 and the second dies 21.

The second molding part 20 includes, in addition to the second dies 21, a frame 22, retaining members 23, return springs 24, stoppers 25, intake/vent pipes 26, spark plugs 27, valves 28, and combustion chambers 29. The second dies 21 are composed, for example, of metal, and describe an oblong shape. Each of the second dies 21 has a second molding surface 21a that is opposed to the first die 11 and formed by irregular shapes lined up at constant spacing, giving the surface the product shape of the second molding surface 50b2 that is pre-molded onto the other surface opposite the first surface of the separator base material 50. This product shape is equivalent to the final shape of the second molding surface 50b2 of the separator 51. For example, three of the second dies 21 are lined up with their individual second molding surfaces 21a facing the same direction, in respective opposition to the first die 11. Except in their end portions, the pressing surfaces 21b opposite from the second molding surfaces 21a of the second dies 21 curve to a concave shape. As shown in FIG. 2, a space for sandwiching the molding parts 50b of the separator base material 50 is provided between the row of three second dies 21 and the single first die 11.

The frame 22 is composed, for example, of metal, and has an oblong shape provided with a plurality of housing spaces with intervening partitions 22a. The frame 22 houses the three second dies 21 in such way as to permit respective movement thereof in a direction towards and away from the first die 11. The retaining members 23 are housed in the frame 22, in opposition to the pressing surfaces 21b of the second dies 21. Three of the retaining members 23 are lined up so as to respectively correspond to the three lined-up second dies 21. The retaining members 23 are composed, for example, of metal, and are formed to oblong shape. The retaining members 23 retain the return springs 24, the stoppers 25, the spark plugs 27, and the intake/vent pipes 26, respectively.

One end of each of the return springs 24 inserts into a hole formed in the retaining member 23, while the other end abuts an end of the pressing surface 21b of the second die 21. The return springs 24 restrict the movement of the second dies 21 when moved by being pressed towards the first die 11. The return springs 24 are composed, for example, of metal, and are formed to helical shape. While the return springs 24 are designed to abut the two ends of the pressing surface 21b of the second die 21, in the end view shown in FIG. 2, the springs are shown abutting only one of these two ends.

One end of each of the stoppers 25 inserts into a hole formed in the retaining member 23, while the other end is joined to an end of the pressing surface 21b of the second die 21. The stoppers 25 restrict the movement of the second dies 21 so that the second dies 21 do not separate by more than a given distance from the retaining members 23. The stoppers 25 are composed, for example, of metal, and are formed to a cylindrical shape having a difference in level, and provided at one end with a large-diameter catch part 25a. The catch parts 25a of the stoppers 25 are designed to catch within holes in the retaining member 23. While the stoppers 25 are designed to be joined to both ends of the pressing surfaces 21b of the second dies 21, in the end view shown in FIG. 2, the stoppers shown joined to only one of these two ends.

Figure 8:
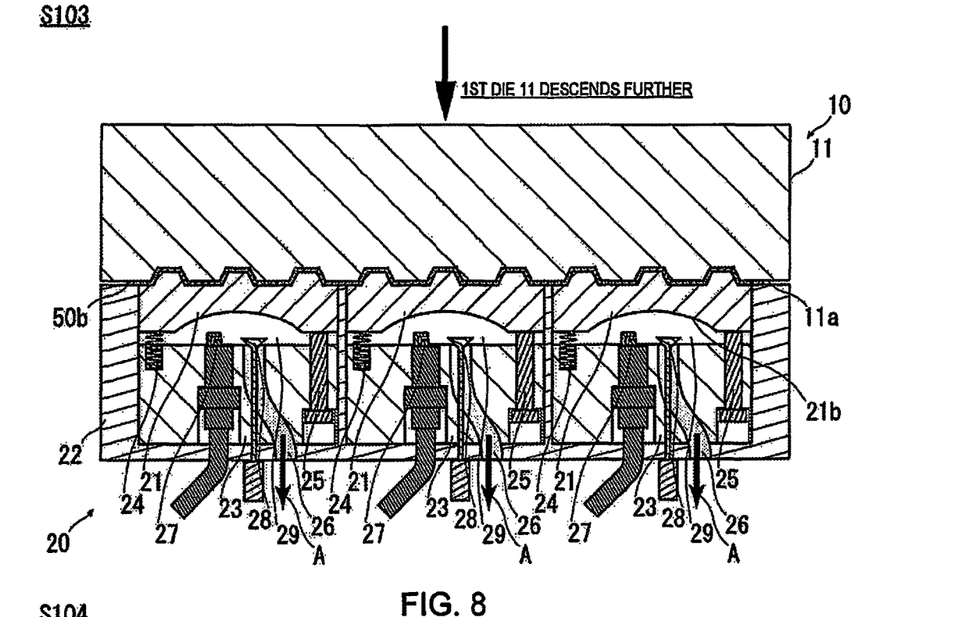
FIG. 8 is an end surface view showing a major portion of the molding device for removing distortion in a separator according to the molding process of S103 of FIG. 5, seen from a side surface.
Figure 9:
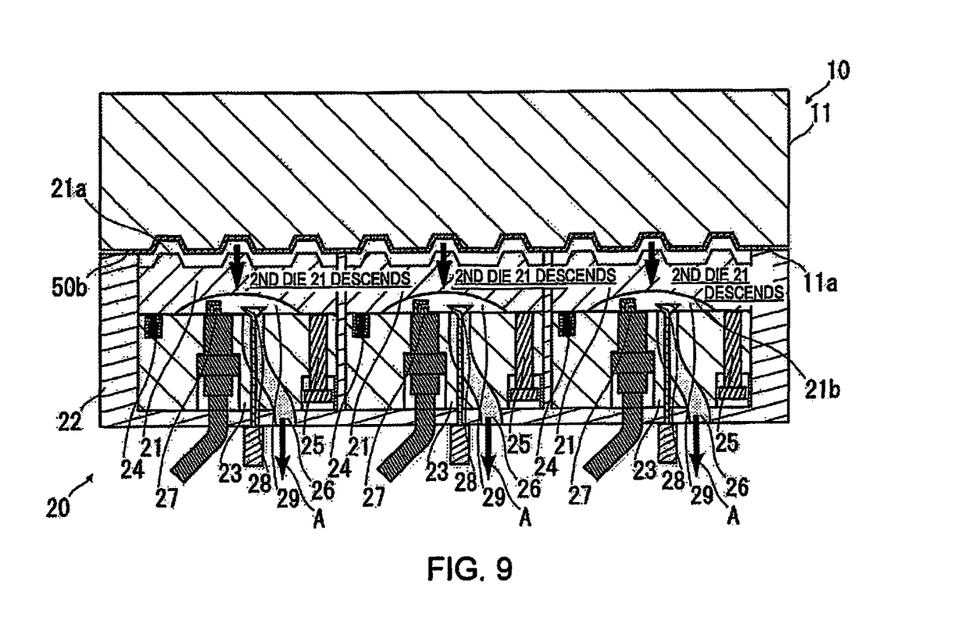
FIG. 9 is an end surface view showing a major portion of the molding device for removing distortion in a separator according to the molding process of S104 of FIG. 5, seen from a side surface.

The intake/vent pipes 26 intake mixed gases G (illustrated in FIG. 10) from the combustion chambers 29 situated between the retaining members 23 and the pressing surfaces 21b of the second dies 21, and discharge combusted gases and air A (illustrated in FIGS. 8 and 9). The intake/vent pipes 26 are arranged passing through the retaining members 23. The intake/vent pipes 26 are composed, for example, of metal, and are formed to round tubular shape. The spark plugs 27 ignite the mixed gases G taken into the combustion chambers 29. The spark plugs 27 are arranged passing through the retaining members 23, with the distal ends thereof facing into the combustion chambers 29. The valves 28 open and close the distal ends of the intake/vent pipes 26. The valves 28 are equivalent, for example, to fuel injection valves, and are arranged passing through the retaining members 23, so as to be able to open and close the distal ends of the intake/vent pipes 26. With the valves 28 closed and the combustion chambers 29 in the sealed state, the spark plugs 27 ignite the mixed gases G in the combustion chambers 29. The mixed gases G, once ignited, expand in association with explosion. As the mixed gases G expand, the second dies 21 are moved at high speed towards the first die 11.

The controller 30 controls the operation of the first die 11 and the second dies 21. The controller 30 performs a control to apply an impact force to press the first die 11 towards the side of the first molding surface 50b1 of the separator base material 50, causing the separator base material 50 to move in a direction towards the second dies 21. Specifically, using the drive member 12, the controller 30 moves the first die 11 at high speed in the direction towards the second dies. Thereafter, the controller 30 performs a control so as to press the second dies 21 towards second molding surface 50b2 side of the separator base material 50, and sandwich the molding parts 50b of the separator base material 50 between the first die 11 and the second dies 21. Specifically, the controller 30 uses the spark plugs 27 to combust the mixed gases G of the combustion chamber 29, moving the second dies 21 at high speed in a direction towards the first die 11.

As shown in FIG. 2, the controller 30 is connected to the first molding part 10 and the second molding part 20, respectively. The controller 30 is composed of a read-only memory (ROM), a central processing unit (CPU), a random access memory (RAM), and the like. The ROM stores a control program for removing distortion in the molding parts 50b of the separator base material 50. The CPU, on the basis of the control program, controls the respective operations of the first die 11 and the second dies 21. The RAM temporarily stores various types of data during elimination of distortion in the molding parts 50b of the separator base material 50 by the first die 11 and the second dies 21.

Next, a method for using the molding device 1 to mold a separator will be described while making reference to FIGS. 5 to 15.

Figure 5:
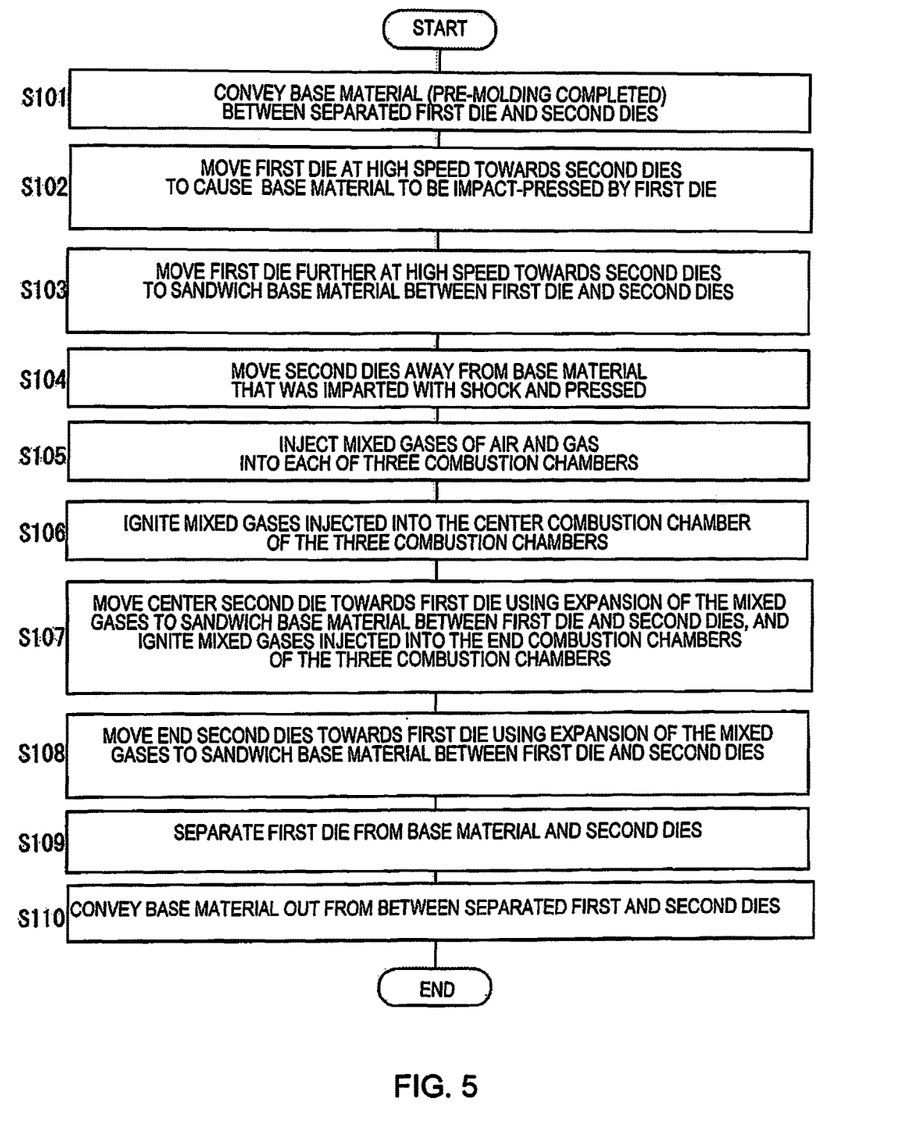
FIG. 5 is a flowchart showing a molding process that employs a molding device for removing distortion in a separator.

FIG. 5 is flowchart showing a molding process that employs the molding device 1. The denotation "base material" in FIG. 5 corresponds to the separator base material 50. FIGS. 6 to 15 are end surface views showing a major portion of the molding device 1 to the molding process of S101 to S110, seen from a side surface. The denotation "base material" in FIGS. 6 and 15 corresponds to the "separator base material 50."

Figure 6:
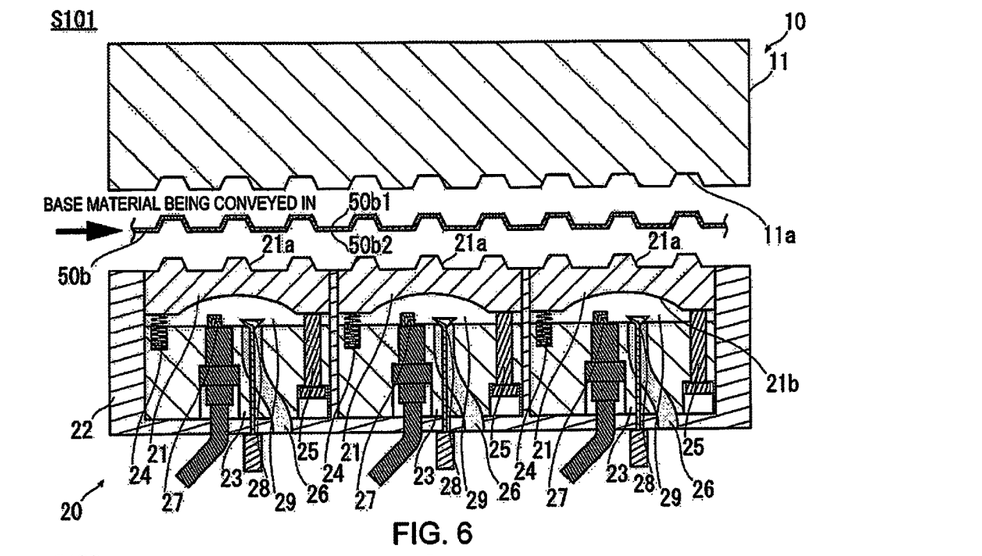
FIG. 6 is an end surface view showing a major portion of the molding device for removing distortion in a separator according to the molding process of S101 of FIG. 5, seen from a side surface.

As shown in FIG. 6, in S101, the separator base material 50, which is pre-molded to a shape corresponding to the product shape, is conveyed in between the separated first die 11 and second dies 21. The separator base material 50 conveyed in between the separated first die 11 and second dies 21 has previously undergone preparatory molding of the irregular molding parts 50b by the processing machine 100, but the manifold holes have yet to be molded. The valves 28 are positioned so that the distal ends of the intake/vent pipes 26 are open. The valves 28 stay open for the duration of the molding operation of S101 shown in FIG. 6 to S105 shown in FIG. 10.

Figure 7:
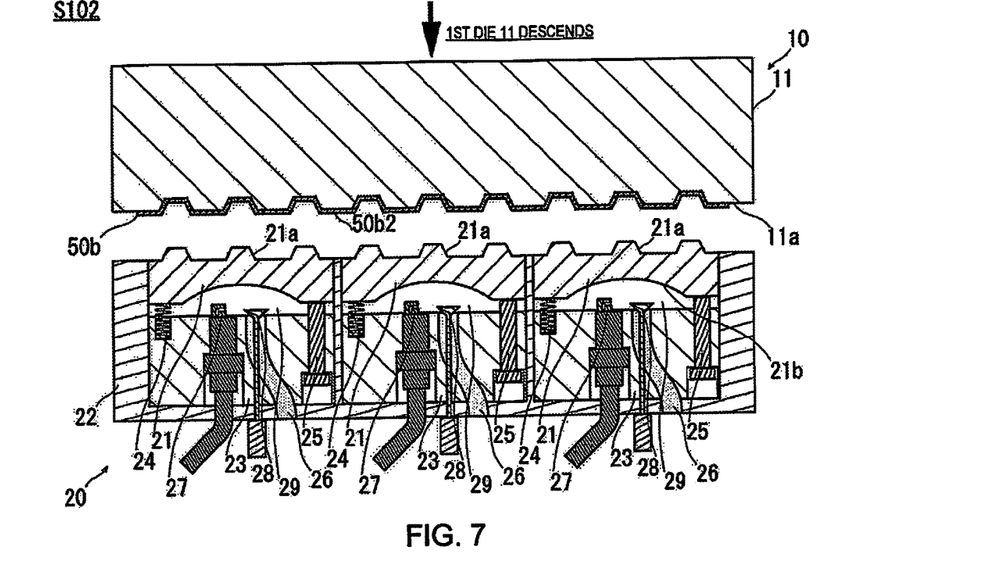
FIG. 7 is an end surface view showing a major portion of the molding device for removing distortion in a separator according to the molding process of S102 of FIG. 5, seen from a side surface.

Further, as shown in FIG. 7, in S102, continuing on from the operation of S101, the first die 11 is moved at high speed in the direction towards the second dies 21, and the separator base material 50 is impact-pressed by the first die 11. The first die 11 is operated using the drive member 12, on the basis of control by the controller 30. Specifically, the first molding surface 11a of the first die 11 is impact-pressed towards the first molding surface 50b1 pre-molded onto a first surface of the separator base material 50, and plastic deformation of the molding parts 50b is induced, thereby molding the molding parts 50b to a shape approximating the final product shape.

Further, as shown in FIG. 8, in S103, continuing on from the operation of S102, the first die 11 is moved further at high speed in the direction towards the second dies 21, sandwiching the separator base material 50 by the first die 11 and the second dies 21. An impact force is imparted to the molding parts 50b of the separator base material 50 between the first die 11 and the second dies 21, inducing plastic deformation to more closely approximate the final product shape.

Further, as shown in FIG. 9, in S104, continuing on from the operation of S103, the second dies 21 which are impact-pressed from the separator base material 50 move apart from the separator base material 50. The second dies 21 come into abutment at the ends of their pressing surfaces 21b towards the retaining members 23, and halt. The combustion chambers 29 decrease in volume, and the air A is vented through the intake/vent pipes 26. In this state, the return springs 24 contract and the stoppers 25 retract.

Figure 10:
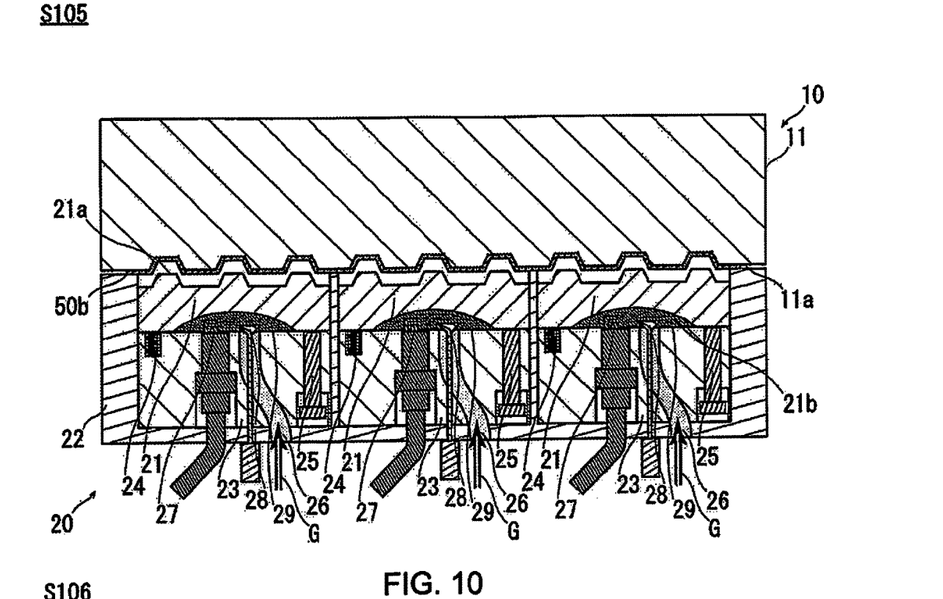
FIG. 10 is an end surface view showing a major portion of the molding device for removing distortion in a separator according to the molding process of S105 of FIG. 5, seen from a side surface.

Further, as shown in FIG. 10, in S105, continuing on from the operation of S104, the mixed gases G of air and gas is injected respectively into the three combustion chambers 29. The mixed gases G are injected into the combustion chambers 29 through the intake/vent pipes 26. In this state, the return springs 24 remain contracted, and the stoppers 25 retracted.

Figure 11:
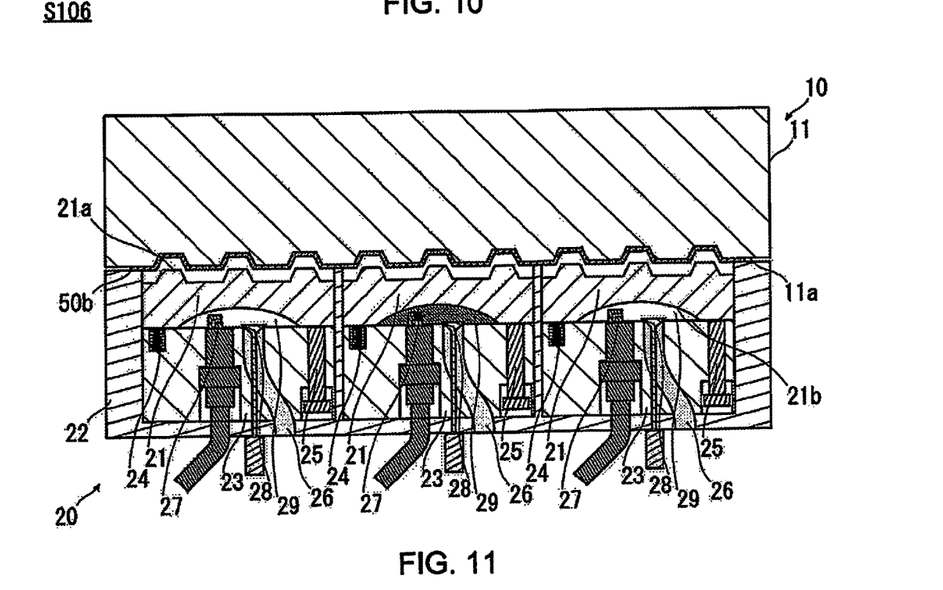
FIG. 11 is an end surface view showing a major portion of the molding device for removing distortion in a separator according to the molding process of S106 of FIG. 5, seen from a side surface.

Further, as shown in FIG. 11, in S106, continuing on from the operation of S105, the mixed gases G injected into the center combustion chamber 29 of the three combustion chambers 29 is ignited. After the distal end of the intake/vent pipe 26 has been closed by the valve 28, the spark plug 27 situated in the center combustion chamber 29 is caused to discharge through a flow of electrical current, igniting the mixed gases G. Of the molding operations from S106 shown in FIG. 11 to S110 shown in FIG. 15, the valve 28 is closed for the duration of the molding operations from at least S106 shown in FIG. 11 to S108 shown in FIG. 13.

Figure 12:
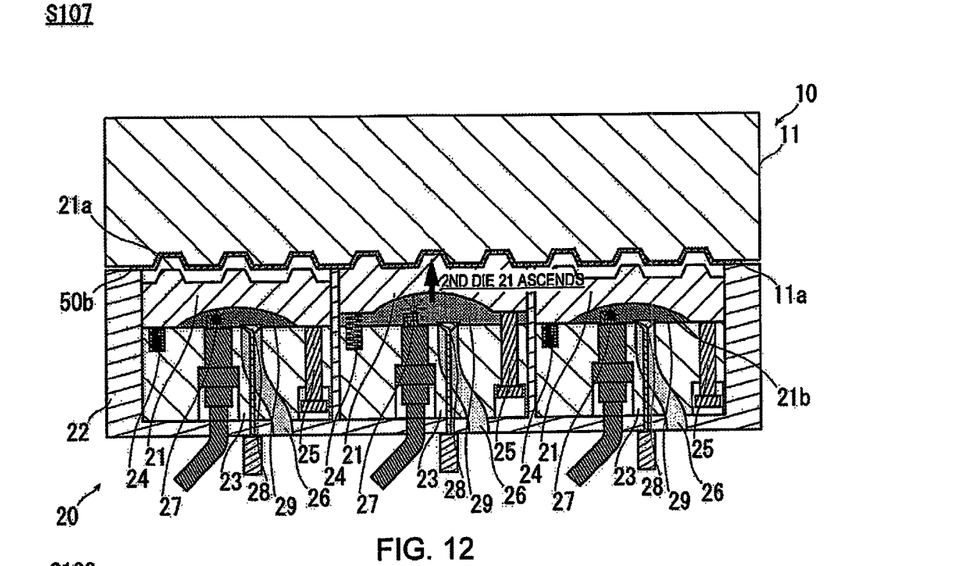
FIG. 12 is an end surface view showing a major portion of the molding device for removing distortion in a separator according to the molding process of S107 of FIG. 5, seen from a side surface.

Further, as shown in FIG. 12, in S107, continuing on from the operation of S106, due to expansion of the mixed gases G in the center combustion chamber 29 the center second die 21 is moved towards the first die 11, and the separator base material 50 is impact-sandwiched by the first die 11 and the second die 21. In this state, the center return spring 24 extends, and the central stopper 25 moves in the direction towards the first die 11, becoming caught in the hole of the retaining member 23 and coming to a halt. The molding parts 50b of the separator base material 50 again plastically deform between the first die 11 positioned at the center and the second die 21 positioned at the center, and reach the final product shape. At the same time, the mixed gases G injected into the combustion chambers at either end of the three combustion chambers 29 are ignited. The mixed gases G are ignited by discharging the spark plugs 27 situated in the combustion chambers 29 at either end, through a flow of electrical current thereto.

Figure 13:
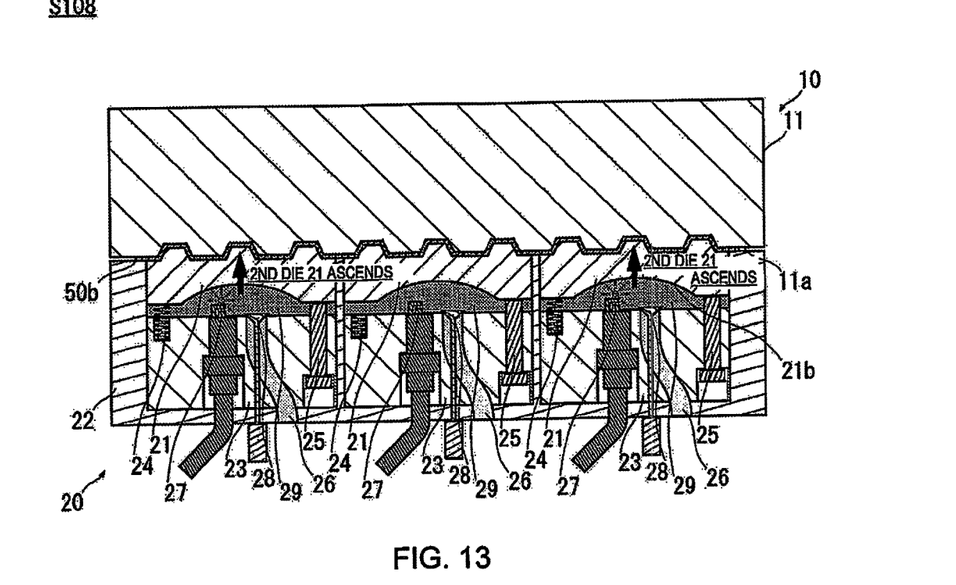
FIG. 13 is an end surface view showing a major portion of the molding device for removing distortion in a separator according to the molding process of S108 of FIG. 5, seen from a side surface.

Further, as shown in FIG. 13, in S108, continuing on from the operation of S107, due to expansion of the mixed gases G in the combustion chambers 29 at either end, the second dies 21 at either end are moved towards the first die 11, and the separator base material 50 is impact-sandwiched by the first die 11 and the second dies 21. In this state, the return springs 24 at either end extend, and the stoppers 25 at either end move in the direction towards the first die 11, becoming caught in the holes of the retaining members 23 and coming to a halt. The molding parts 50b of the separator base material 50 sandwiched between the first die 11 and the second dies 21 at either end again plastically deform, and reach the final product shape.

Figure 14:
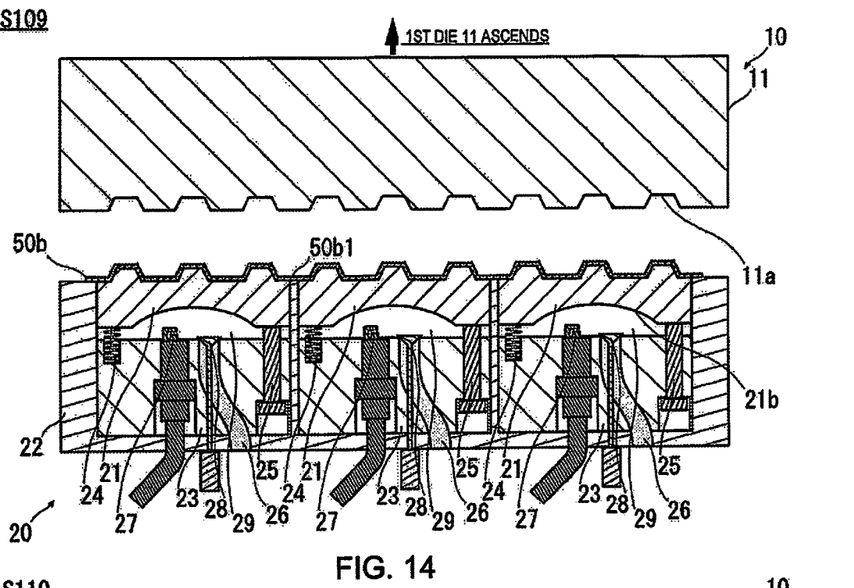
FIG. 14 is an end surface view showing a major portion of the molding device for removing distortion in a separator according to the molding process of S109 of FIG. 5, seen from a side surface.

Further, as shown in FIG. 14, in S109, continuing on from the operation of S108, the first die 11 is separated from the separator base material 50 and the second dies 21. The first die 11 is operated using the drive member 12, on the basis of the control by the controller 30.

Figure 15:
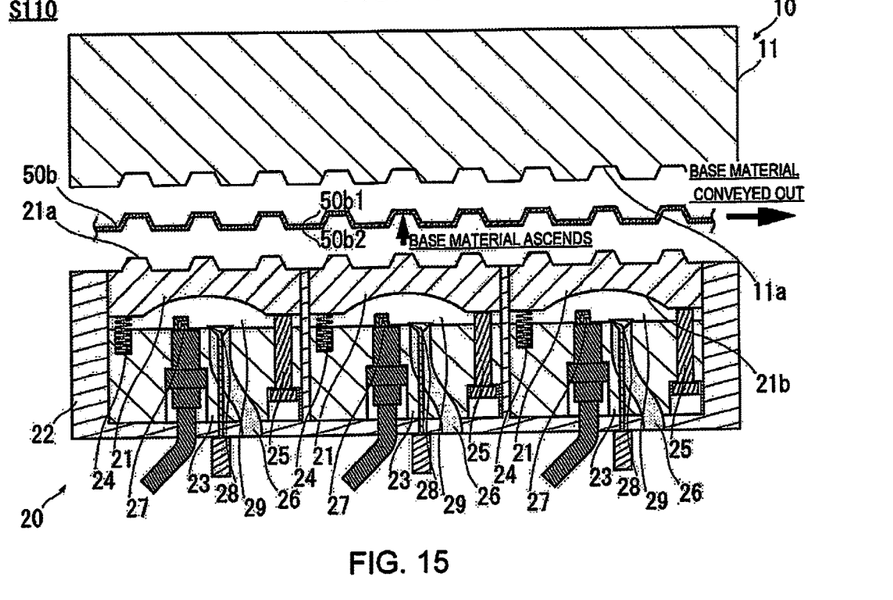
FIG. 15 is an end surface view showing a major portion of the molding device for removing distortion in a separator according to the molding process of S110 of FIG. 5, seen from a side surface.

Further, as shown in FIG. 15, in S110, continuing on from the operation of S109, the separator base material 50, which has been completely molded to a shape corresponding to the product shape, is conveyed out from between the separated first die 11 and second dies 21. The incoming feeder 130 and the outgoing feeder 150 of the processing machine 100 are used to convey out the completely molded separator base material 50. After the manifold holes have been molded into the separator base material 50 using the processing machine 100, the outer edge section of the separator 51 is punched out, opening up a punch hole 50i. The separator 51 is conveyed out by the outgoing conveyor 140.

Molding according to S101 to S110 shown in the flowchart in FIG. 5 was described while referring to the molding device 1 shown in FIGS. 6 to 15. The processing machine 100 is provided with the molding device 1 that continuously molds the separators 51 from the separator base material 50, which is of indefinite length. Specifically, the molding method according to S101 to S110 is carried out continuously at constant intervals on the separator base material 50 of indefinite length.

The molding method and the molding device 1 for the separator 51 according to the present embodiment set forth above provides the following operations and effects.

The method for removing distortion in the separator 51 is a method for removing distortion in the molding parts 50b of the separator base material 50 which has been pre-molded to a shape corresponding to the product shape. In this molding method for the separator 51, there are employed the first die 11 corresponding to the product shape of the first molding surface 50b1 pre-molded onto a first surface of the separator base material 50, and the second dies 21 opposed to the first die 11 and corresponding to the product shape of the second molding surface 50b2 pre-molded onto the other surface opposite the first surface of the separator base material 50. The molding method for the separator 51 has a first molding step and a second molding step. In the first molding step, the first die 11 is imparted with an impact force and pressed towards the side of the first molding surface 50b1 of the separator base material 50, causing the separator base material 50 to move towards the second dies 21. In the second molding step which follows the first molding step, the second dies 21 are pressed towards the side of the second molding surface 50b2 of the separator base material 50, and the molding parts 50b of the separator base material 50 are sandwiched between the first die 11 and the second dies 21.

Here, the first molding step is equivalent to " . . . moving the first die at high speed towards the second dies, and causing the base material to be impact-pressed by the first die" as disclosed in S012 of the flowchart shown in FIG. 5. The second molding step is equivalent to "sandwiching the base material between the first die and the second dies" as disclosed respectively in S107 and S108.

The molding device 1 for removing stress in the separator 51 is a device for removing distortion in the molding parts 50b of the separator base material 50 which has been pre-molded to a shape corresponding to the product shape. The molding device 1 for removing distortion in the separator 51 has the first die 11, the second dies 21, and the controller 30. The first die 11 corresponds to the product shape of the first molding surface 50b1 pre-molded onto a first surface of a separator base material 50. The second dies 21 correspond to the product shape of the second molding surface 50b2 pre-molded onto the other surface opposite the first surface of the separator base material 50. The controller 30 controls the operation of the first die 11 and the second dies 21. The controller 30 performs a control so as to apply an impact force to press the first die 11 towards the side of the first molding surface 50b1 of the separator base material 50, causing the separator base material 50 to move in the direction towards the second dies 21. Thereafter, the controller 30 performs a control so as to press the second dies 21 towards the side of the second molding surface 50b2 of the separator base material 50, and sandwich the molding parts 50b of the separator base material 50 between the first die 11 and the second dies 21.

According to this configuration, after the first die 11 is imparted with an impact force and pressed towards the side of the first molding surface 50b1, and moves the separator base material 50 in the direction towards the second dies 21, the second dies 21 are pressed towards the side of the second molding surface 50b2, sandwiching the molding parts 50b of the separator base material 50 between the first die 11 and the second dies 21. According to this molding method for the separator 51 and molding device 1, by imparting an impact force and molding the molding parts 50b of the separator base material 50 pre-molded to a shape corresponding to the product shape, distortion remaining in the molding parts 50b can be removed to a sufficient extent. Consequently, according to the molding method for the separator 51 and the molding device 1 of the present embodiment, the separator 51 can be molded with high accuracy.

In particular, with the molding method and the molding device 1 for the separator 51 configured in the above manner, the irregular shapes of channels for which specifications as to the flow rate, pressure loss, and the like of media (fuel gas, oxidant gas, and cooling water) are quite stringent can be molded with high accuracy. Consequently, according to this configuration, the flow rate of media flowing through the channels can be ensured, and pressure loss of the media flowing through the channels can be reduced.

Further, a configuration in which the second dies 21 are imparted with impact and pressed towards the side of the second molding surface 50b2 of the separator base material 50 can be employed.

Here, the second molding step is equivalent to "moving the second dies towards the first die . . . through expansion of the mixed gases, sandwiching the base material between the first die and the second die" as disclosed respectively in S107 and S108 of the flowchart shown in FIG. 5.

According to this configuration, molding can be accomplished while imparting an impact force to the first die 11 towards the side of the first molding surface 50b1, and molding can be accomplished while imparting an impact force to the second dies 21 towards the side of the second molding surface 50b2. Consequently, distortion remaining in the molding parts 50b can be removed to a sufficient extent. Specifically, according to this configuration, the separator 51 can be molded with high accuracy.

Further, a configuration in which the plurality of second dies 21 are pressed at different timing towards different sections on the side of the second molding surface 50b2 of the separator base material 50 can be employed.

Here, the second molding step is equivalent to " . . . moving the center second die towards the first die, sandwiching the base material between the first die and the second die" as disclosed in S107 of the flowchart shown in FIG. 5, and to "moving the second dies at either end towards the first die, sandwiching the base material between the first die and the second die" as disclosed in S108.

According to this configuration, particularly in cases in which, for example, the pattern of distortion remaining within the molding parts 50b is non-uniform, the side of the second molding surface 50b2 of the molding parts 50b can be pressed sequentially from one end to the other, for example. Specifically, distortion within the molding parts 50b can be removed while moving from one end towards the other end, for example. Consequently, residual distortion can be removed to a sufficient extent throughout the entire area of the molding parts 50b.

Further, a configuration whereby, after the second die 21 positioned at the center is pressed towards the side of the second molding surface 50b2 of the separator base material 50, the second dies 21 positioned further towards the outside from the center are pressed towards the side of the second molding surface 50b2 of the separator base material 50 can be employed.

According to this configuration, by pressing the side of the second molding surface 50b2 of the molding parts 50b sequentially from the center to the outside, distortion remaining at the outside peripheral edges of the molding parts 50b can be effectively pushed out and removed. Consequently, distortion remaining at the outside peripheral edges of the molding parts 50b can be effectively removed by this configuration.

Further, a configuration in which, in the first molding step in the molding method for the separator 51, the second dies 21 pushed away from the side of the second molding surface 50b2 from the separator base material 50 separate away from the separator base material 50, and in the second molding step, the second dies 21 separated from the separator base material 50 are pressed towards the side of the second molding surface 50b2 of the separator base material 50 can be employed.

Here, the first molding step is equivalent to "the second dies 21 impact-pressed from the base material move away from the base material" as disclosed in S104 of the flowchart shown in S104. The second molding step is equivalent to S107 and S108.

Likewise, in the separator 51 molding device 1, a configuration whereby, after the second dies 21 pressed away from the side of the second molding surface 50b2 from the separator base material 50 have separated away from the separator base material 50, the second dies 21 are pressed towards the side of the second molding surface 50b2 of the separator base material 50, can be employed in the controller 30.

According to this configuration, in contrast with the case in which the second dies 21 are pressed towards the side of the second molding surface 50b2 while still in a state of contact towards the separator base material 50, the second dies 21 can be accelerated sufficiently through the separating space, before being pressed towards the second molding surface 50b2. Consequently, the second dies 21 can be pressed towards the side of the second molding surface 50b2 of the separator base material 50, while imparting greater impact thereto. Specifically, distortion remaining in the molding parts 50b can be effectively removed. Consequently, the separator 51 can be molded with higher accuracy.

Further, in the separator 51 molding device 1, a configuration whereby the second dies 21 having separated from the separator base material 50 are imparted with impact and pressed towards the side of the second molding surface 50b2 can be employed in the controller 30.

According to this configuration, as compared with the case in which the second dies 21, while still in a state of contact towards the separator base material 50, are pressed towards the side of the second molding surface 50b2 without imparting an impact force, the second dies 21 can be accelerated sufficiently through the separating space before being pressed towards the second molding surface 50b2. Consequently, the second dies 21 can be pressed towards the side of the second molding surface 50b2 of the separator base material 50, while imparting pronounced impact thereto. Specifically, distortion remaining in the molding parts 50b can be removed very effectively. Consequently, the separator 51 can be molded with very high accuracy.

Additionally, various modifications of the present invention based on the configuration set forth in the patent claims are possible, and such modifications would fall within the scope of the present invention.

For example, the present embodiment describes a configuration whereby, in the second molding step, the mixed gases G in the combustion chambers 29 are ignited and expand, thereby pressing the second dies 21 towards the side of the second molding surface 50b2 in such a way as to impart impact thereto. However, there is no limitation to this particular configuration, and a configuration in which, for example, the second dies 21 are pressed towards the side of the second molding surface 50b2 by injecting and discharging water into and from areas corresponding to the combustion chambers 29 would also be acceptable. Likewise, a configuration in which the second dies 21 are pressed towards the side of the second molding surface 50b2 by while driven, for example, by an electric motor or hydraulic cylinder would also be acceptable.

The invention claimed is:

1. A molding method for removing distortion in a molding part of a separator base material which has been pre-molded to a shape corresponding to a product shape, the method comprising:

employing a first die which corresponds to a product size and shape of a corrugated first molding surface pre-molded onto a first surface of the separator base material, and a plurality of second dies which are opposed to the first die and which correspond to a product size and shape of a corrugated second molding surface pre-molded onto the other surface opposite the first surface of the separator base material, feeding the separator base material having the corrugated first molding surface pre-molded onto the first surface of the separator base material and the corrugated second molding surface pre-molded onto the other surface to the first die and the plurality of second dies;

a first molding step in which the first die is pressed by applying an impact force towards the first molding surface of the separator base material causing the separator base material to move towards the second dies, and a second molding step subsequent to the first molding step, in which the second dies are pressed towards the second molding surface side of the separator base material, and the molding part of the separator base material is sandwiched between the first die and the second dies, the second dies being pressed by supplying a fluid to each of a plurality of chambers formed between each of the plurality of second dies and each of a plurality of retaining members, and expanding the fluid in each of the plurality of chambers to independently move each of the plurality of second dies toward the base material.

2. The molding method according to claim 1, wherein the second molding step includes pressing the second dies towards and impacting the second molding surface of the separator base material.

3. The molding method according to claim 2, wherein during the first molding step, the second dies are separated from the separator base material, and during the second molding step, the second dies, which have separated from the separator base material, are pressed towards the second molding surface of the separator base material.

4. The molding method according to claim 2, wherein the second molding step includes pressing second dies at different timing towards different sections of the second molding surface of the separator base material.

5. The molding method according to claim 4, wherein the second molding step includes pressing a center located one of the second dies towards the second molding surface of the separator base material, and then pressing the second dies positioned outwardly from the center located one of the second dies towards the second molding surface of the separator base material.

6. The molding method according to claim 1, wherein the second molding step includes pressing the second dies at different timing towards different sections of the second molding surface of the separator base material.

7. The molding method according to claim 6, wherein the second molding step includes pressing a center located one of the second dies, towards the second molding surface of the separator base material, and then pressing the second dies positioned outwardly from the center located one of the second dies towards the second molding surface of the separator base material.

8. The molding method according to claim 6, wherein during the first molding step, the second dies are separated from the separator base material, and during the second molding step, the second dies, which have separated from the separator base material, are pressed towards the second molding surface of the separator base material.

9. The molding method according to claim 7, wherein during the first molding step, the second dies are separated from the separator base material, and during the second molding step, the second dies, which have separated from the separator base material, are pressed towards the second molding surface of the separator base material.

10. The molding method according to claim 1, wherein during the first molding step, the second dies are separated from the separator base material, and during the second molding step, the second dies, which have separated from the separator base material, are pressed towards the second molding surface of the separator base material.

11. The molding method according to claim 1, wherein movement of each of the plurality of second dies is limited by a stopper movably connected between each of the second dies and the respective retaining member.

12. A molding device for removing distortion in a molding part of a separator base material which has been pre-molded to a shape corresponding to a product shape, the molding device comprising:

a first die corresponding to a product size and shape of a corrugated first molding surface pre-molded onto a first surface of the separator base material;

a plurality of second dies corresponding to a product size and shape of a corrugated second molding surface pre-molded onto another surface opposite the first surface of the separator base material, the separator base material having the corrugated first and second molding surfaces being fed to the first die and the plurality of second dies, each of the plurality of second dies having a retaining member connected thereto, a chamber being disposed between each of the plurality of second dies and the respective retaining member, and fluid supplied to each of the chambers being expanded to independently move each of the plurality of second dies toward the base material; and a controller programmed to control operations of the first die and the second dies, the controller performing a control so as to apply an impact force to press the first die towards the first molding surface of the separator base material causing the separator base material to move in a direction towards the second dies, and to then press the second dies towards the second molding surface side of the separator base material, and sandwich the molding part of the separator base material between the first die and the second dies.

13. The molding device according to claim 12, wherein the controller is programmed to initially position the second dies in apposition separate from the separator base material, and then presses the second dies towards the second molding surface of the separator base material.

14. The molding device according to claim 13, wherein the controller applies an impact force to press the second dies, which separated from the separator base material, towards the second molding surface side.

15. The molding device according to claim 12, wherein a stopper is movably connected between each of the plurality of second dies and each respective retaining member to limit movement of the second die toward the base material.

* * * * *